US012679326B2

(12) United States Patent
Moujib et al.

(10) Patent No.: US 12,679,326 B2
(45) Date of Patent: Jul. 14, 2026

(54) METHOD FOR DETECTING A MOTOR VEHICLE OVERWEIGHT STATE, AND METHOD FOR MANAGING THE CHARGE OF A TRACTION BATTERY

(71) Applicant: RENAULT S.A.S, Boulogne Billancourt (FR)

(72) Inventors: Abdelkrim Moujib, Guyancourt (FR); Frederic Roudeau, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 298 days.

(21) Appl. No.: 18/549,390

(22) PCT Filed: Mar. 8, 2022

(86) PCT No.: PCT/EP2022/055955
§ 371 (c)(1),
(2) Date: Sep. 7, 2023

(87) PCT Pub. No.: WO2022/189468
PCT Pub. Date: Sep. 15, 2022

(65) Prior Publication Data
US 2024/0149861 A1 May 9, 2024

(30) Foreign Application Priority Data

Mar. 10, 2021 (FR) ...................................... 21 02328

(51) Int. Cl.
*B60W 20/11* (2016.01)
*B60W 10/26* (2006.01)
(Continued)

(52) U.S. Cl.
CPC ............ *B60W 20/11* (2016.01); *B60W 10/26* (2013.01); *B60W 20/13* (2016.01); *B60W 20/19* (2016.01);
(Continued)

(58) Field of Classification Search
CPC ...... B60W 10/26; B60W 20/11; B60W 20/13; B60W 20/19; B60W 40/1005; B60W 40/13
See application file for complete search history.

(56) References Cited

U.S. PATENT DOCUMENTS 8,229,613 B2 * 7/2012 Kato ...................... B60W 20/00
701/34.2
9,205,843 B2 * 12/2015 Sannodo ............... B60W 50/14
(Continued)

FOREIGN PATENT DOCUMENTS

| FR | 2 822 972 A1 | 10/2002 |
|----|--------------|---------|
| FR | 3 012 397 A1 | 5/2015 |
| JP | 2017-501918 A | 1/2017 |

OTHER PUBLICATIONS

International Search Report issued Jun. 8, 2022 in PCT/EP2022/055955, filed on Mar. 8, 2022, 2 pages.
(Continued)

*Primary Examiner* — Jeffrey J Restifo
(74) *Attorney, Agent, or Firm* — Oblon, McClelland, Maier & Neustadt, L.L.P.

(57) ABSTRACT

A method detects a vehicle overweight state for a vehicle equipped with a power unit including a traction battery. The method selects a number of vehicle acceleration phases. The method includes, for each selected acceleration phase: calculating a mean value of a differential force equal to a value of the traction loads of the unit from which there are subtracted the value of the acceleration resultant force and the value of the sum of the resistive loads experienced by the vehicle, calculating a statistical value based on the calculated mean values of the differential force, and comparing the statistical value against a vehicle overweight threshold (Continued)

value. The vehicle is in an overweight state if the statistical value is higher than the threshold value.

9 Claims, 3 Drawing Sheets

(51) Int. Cl.

| | | |
|---|---|---|
| *B60W 20/13* | (2016.01) | |
| *B60W 20/19* | (2016.01) | |
| *B60W 40/10* | (2012.01) | |
| *B60W 40/13* | (2012.01) | |

(52) U.S. Cl.
CPC ........ *B60W 40/1005* (2013.01); *B60W 40/13* (2013.01); *B60W 2520/105* (2013.01); *B60W 2552/15* (2020.02)

(56) References Cited

U.S. PATENT DOCUMENTS

| | | | | |
|---|---|---|---|---|
| 9,714,024 | B2 * | 7/2017 | Yoon | B60W 20/12 |
| 9,817,018 | B2 * | 11/2017 | Sannodo | B60W 40/1005 |
| 10,024,878 | B2 * | 7/2018 | Sannodo | B60W 30/143 |
| 10,071,742 | B2 * | 9/2018 | Hall | B60W 40/13 |
| 10,124,798 | B2 * | 11/2018 | Hall | G05D 1/027 |
| 10,480,645 | B2 | 11/2019 | Le-Cam et al. | |
| 11,148,620 | B2 * | 10/2021 | Wippler | B60W 50/14 |
| 11,187,287 | B2 * | 11/2021 | Lee | B60K 6/485 |
| 11,299,140 | B2 * | 4/2022 | Honjo | B60L 58/13 |
| 11,820,358 | B2 * | 11/2023 | Sakashita | H02J 7/00 |
| 11,884,124 | B2 * | 1/2024 | Noland | B60G 9/04 |
| 12,392,623 | B2 * | 8/2025 | Mellinger | B60W 30/188 |
| 2010/0131139 | A1 * | 5/2010 | Sakai | B60K 6/46 |
| | | | | 903/903 |
| 2015/0046010 | A1 * | 2/2015 | Wakashiro | B60W 20/00 |
| | | | | 180/65.265 |
| 2016/0236673 | A1 | 8/2016 | Planche et al. | |
| 2018/0283536 | A1 | 10/2018 | Le-Cam et al. | |
| 2021/0138909 | A1 * | 5/2021 | Tokura | B60W 40/105 |
| 2022/0219697 | A1 * | 7/2022 | Bucher | B60W 30/188 |
| 2024/0149861 | A1 * | 5/2024 | Moujib | B60W 20/13 |

OTHER PUBLICATIONS

French Preliminary Search Report issued Nov. 2, 2021 in FR application 21 02328, filed on Mar. 10, 2021, 3 pages (with English Translation of Categories of Cited Documents).

* cited by examiner

METHOD FOR DETECTING A MOTOR VEHICLE OVERWEIGHT STATE, AND METHOD FOR MANAGING THE CHARGE OF A TRACTION BATTERY

TECHNICAL FIELD OF THE INVENTION

The present invention relates to a method for detecting a state of excessive weight of a motor vehicle.

The invention relates also to a method for managing the charge of a traction battery with which such a vehicle is equipped.

TECHNICAL BACKGROUND

Conventionally, a so-called hybrid drive vehicle uses the combination of a heat drive produced by a heat engine with an electric drive produced by at least one electric motor which is powered at least partly by a so-called traction electric battery.

A hybrid vehicle uses three types of traction:
traction in electrical mode whereby only the electric motor ensures the movement of the vehicle,
traction in hybrid mode, whereby the heat engine intervenes to sustain the electric motor,
traction in heat mode whereby only the heat engine ensures the movement of the vehicle.

The role of the traction battery is to store the energy necessary for the good operation of the hybrid vehicle and the type of recharge thereof depends on the architecture of the hybrid vehicle used.

The main hybrid vehicle architectures are as follows:
series hybrid: the electric motor or motors ensure the driving of the wheels and the heat engine of smaller size has the exclusive role of generating electricity to recharge the traction battery,
parallel hybrid: one of the most widely used architectures these days in which the operation is based on a parallel use of the heat engine and electric motor, all linked to the transmission of the vehicle. While the vehicle is rolling, the recharging of the traction battery is performed by a regular harvesting of the energy during the vehicle slowing-down and braking phases, commonly called regenerative braking phases,
series-parallel hybrid: this architecture is based on the combination of a heat engine and an electric motor, each being connected independently to the transmission of the vehicle, the traction of the vehicle being either electric or heat.

Depending on the architecture of the hybrid vehicle used, the alternation between the electric, hybrid and heat tractions is managed automatically by a control unit implemented in the vehicle, as a function primarily of the depression of the accelerator pedal by the driver and of the level of charge of the traction battery.

The strategy for managing the charge of the traction battery of the vehicle is managed by an energy management law embedded in the control unit and it makes it possible, via a calculation of a target electrical energy level, to command the charging or the discharging of the traction battery so as to maintain a satisfactory driving service perceived by the driver of the vehicle which is linked to different parameters such as the fuel consumption of the vehicle, the range of the electric traction mode and the nominal performance levels of the vehicle.

Moreover, some exceptional temporary rolling situations require more power to ensure the traction of the vehicle, notably as a function of the physiognomy of the terrain such as, for example, in the case of a high uphill slope (rolling uphill) or else conditions of strong wind. In these temporary rolling situations, the dimensioning of the traction battery does not make it possible to ensure the traction of the vehicle for a long time, because the level of charge of the battery decreases more rapidly than in a nominal rolling situation.

Consequently, when the traction battery is totally discharged, the traction of the vehicle is then taken over totally by the heat engine which is not dimensioned to ensure the full rolling performance level of the vehicle. Consequently, the driving service perceived by the driver of the vehicle is affected.

In order to avoid the phenomena of regression of the performance levels of the vehicle, the energy level in the traction battery is regularly increased in order to constitute a reserve of energy to meet temporary vehicle rolling situations. The maintaining of this reserve of energy is possible because the full performance levels of the vehicle are required only temporarily and with low frequency. Indeed, a path is most often taken in nominal conditions and is regularly punctuated by braking and slowing-down phases, thus allowing the reserve of energy to be restored in the traction battery.

However, in the case of a state of excessive weight of the vehicle such as the loading of an additional weight (passengers, baggage, etc.) or else the traction of an additional rolling weight (trailer, caravan, etc.), when the vehicle encounters an exceptional temporary rolling situation, the energy reserve is not sufficient to ensure the traction of a vehicle in "excessive weight" state. In order to proceed to recharge the traction battery to a sufficiently high energy level, without affecting the performance levels of the vehicle, it is then essential to detect a state of excessive weight of the vehicle well before the vehicle encounters a temporary rolling situation which requires more power. Various methods for detecting the excessive weight of a vehicle are known. For example, the document FR2822972 presents a device for estimating the weight of a vehicle which is based on a differential force calculation according to the fundamental principle of dynamics. Such a detection device also takes account of the external parameters such as the effect of the wind on the vehicle or even the gradient of the terrain. This type of detection method does not make it possible to detect precisely whether or not the vehicle is in a state of excessive weight.

Furthermore, most of the detection methods use sensors located for example on the wheels of the vehicle. However, this type of sensor is intrusive and any failure of one sensor can completely alter the detection of a state of excessive weight of the vehicle.

The invention proposes notably to remedy the drawbacks mentioned and to propose a both precise and reliable method for detecting a state of excessive weight of a motor vehicle equipped with a traction battery to meet exceptional temporary rolling situations of the vehicle without affecting the driving service perceived by the driver of the vehicle, by managing the charge of the traction battery of the vehicle in an excessive weight state.

SUMMARY OF THE INVENTION

The invention proposes a method for detecting a state of excessive weight of a motor vehicle equipped with a power train comprising a traction battery.

The detection method consists in selecting a determined number of phases of longitudinal acceleration of the vehicle, for each of which the longitudinal acceleration is greater than a longitudinal acceleration threshold value. The detection method comprises, for each acceleration phase selected:

a step of calculation of an average value of a differential force which is equal to the value of the traction efforts of the power train from which are subtracted the value of the resultant longitudinal acceleration force of the vehicle and the value of some of the resisting efforts to which the vehicle is subjected while rolling, a step of calculation of a statistical value from the calculated average values of the differential force, and a step of comparison of the calculated statistical value with a threshold value of excessive weight of the vehicle, a detection method whereby the vehicle is considered to be in a state of excessive weight if the statistical value is greater than the threshold excessive weight value of the vehicle.

According to other features of the detection method:

the statistical value is an average of all the calculated average values of the differential force;

the longitudinal acceleration threshold is greater than or equal to 0.5 m/s$^2$;

the selection of the longitudinal acceleration phases is disabled when the speed of the vehicle is greater than a speed threshold value;

the speed threshold value is greater than or equal to 90 km/h;

the number of longitudinal acceleration phases selected is a value associated with the motor vehicle;

the excessive weight threshold value of the vehicle is a constant value associated with the motor vehicle;

the resultant longitudinal acceleration force is defined by the product of the constant value of a reference weight of the vehicle by the value of the longitudinal acceleration of the vehicle;

the resisting efforts are defined by the sum of the aerodynamic drag forces of the vehicle, of the rolling resistance forces of the vehicle and of the forces linked to the gradient of the terrain.

The invention also proposes a method for managing the charge of a traction battery of a motor vehicle which consists in detecting a possible state of excessive weight of the vehicle and, when a state of excessive weight is detected, in increasing the energy level stored in the traction battery to a charge threshold, to meet temporary vehicle rolling situations.

According to another feature of the management method, the detection of a possible state of excessive weight of the vehicle is performed by the detection method.

The invention additionally proposes a power train comprising a heat engine and an electric motor associated with a traction battery, the traction battery charge is controlled by the management method.

BRIEF DESCRIPTION OF THE FIGURES

Other features and advantages of the invention will become apparent from reading the following detailed description, for understanding of which reference will be made to the attached drawings in which:

FIG. 2 is a diagram of the steps in detecting a state of excessive weight of a motor vehicle associated with the

Figure 3:
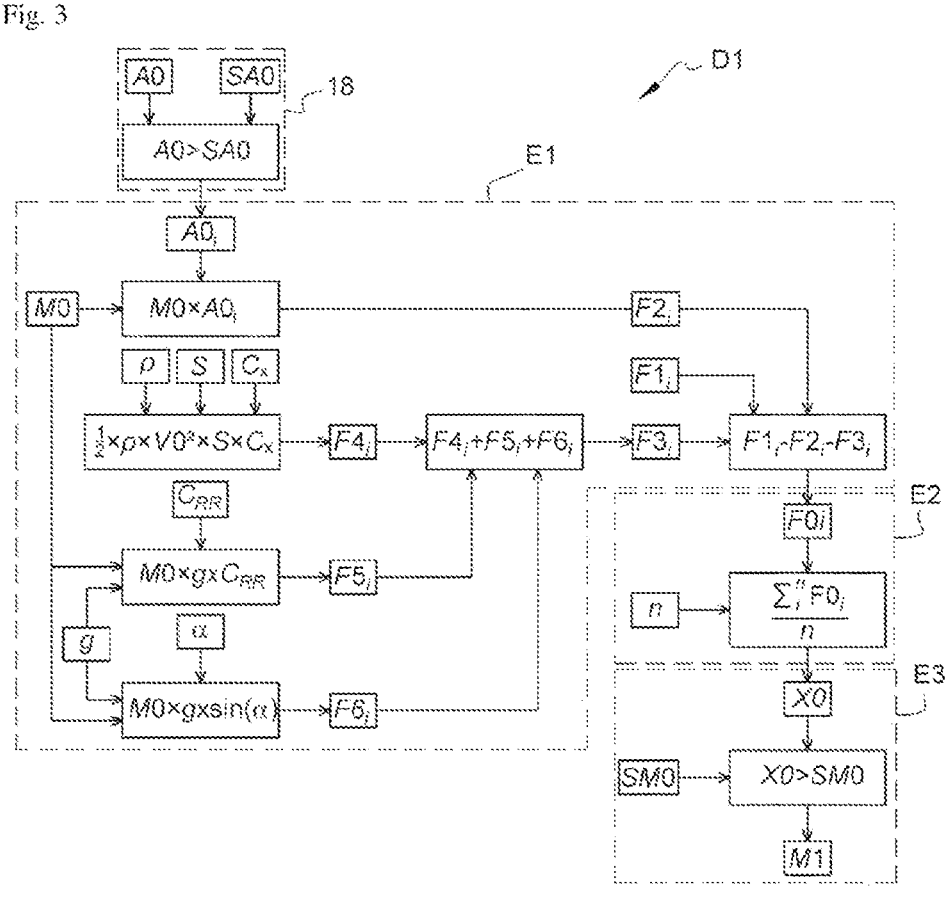
Figure 4A:
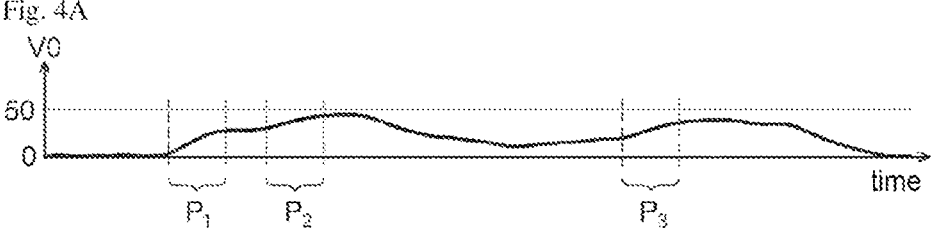
Figure 4B:
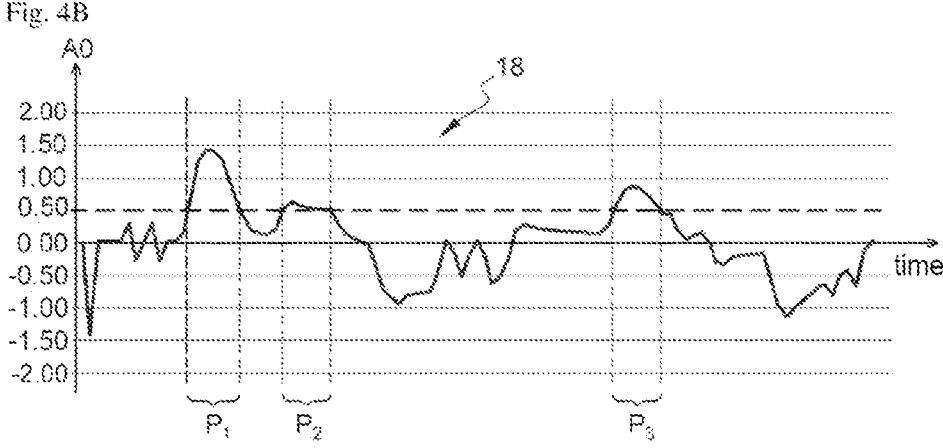
Figure 4C:
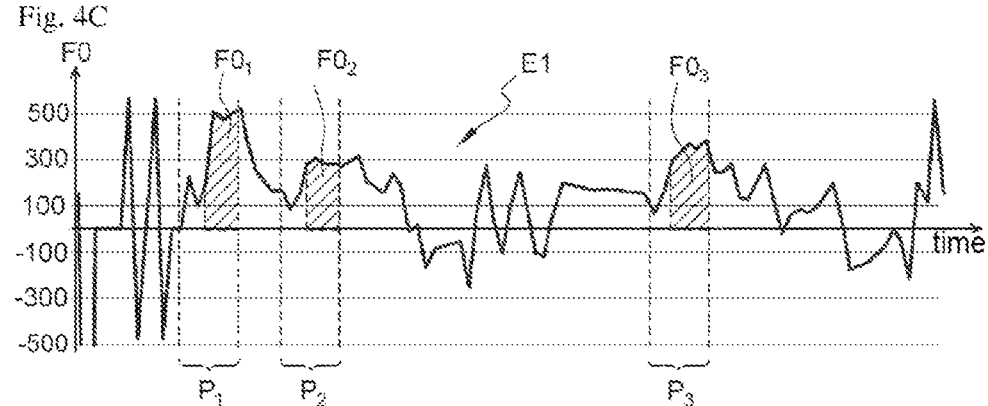

4 method for managing the charge of a traction battery of the vehicle according to the invention;

FIG. 3 is a schematic representation of the method for detecting a state of excessive weight of a vehicle according to the invention;

FIG. 4A is a diagram representing the variation of the speed of the vehicle as a function of time, the association of FIG. 4A with FIGS. 4B and 4B illustrate an example of application of the method for detecting a state of excessive weight of a vehicle according to the invention;

FIG. 4B is a diagram representing the variation of the longitudinal acceleration of the vehicle as a function of time;

FIG. 4C is a diagram representing the variation of the calculated value of the differential force of the vehicle as a function of time.

DETAILED DESCRIPTION OF THE INVENTION

In the following description, the elements that are identical, similar or analogous will be designated by the same alphanumerical references.

The invention relates to a motor vehicle comprising a power train equipped with a traction battery 14.

Figure 1:
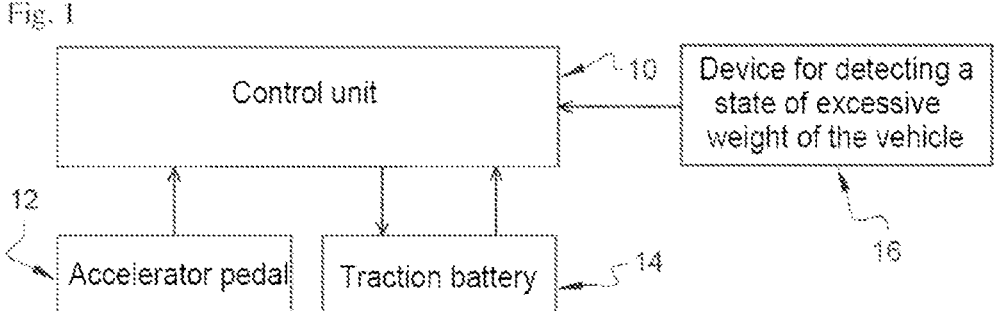
FIG. 1 is a schematic representation of the interaction of the main elements involved in the method for managing the charge of a traction battery of the vehicle according to the invention.

As represented in FIG. 1, a control unit 10, or computer, implemented in the vehicle, supervises the level of charge in electrical energy and the recharging of the traction battery 14.

An accelerator pedal 12 sends a datum to the control unit 10 concerning the depression of accelerator pedal 12 by the driver of the vehicle. The traction battery 14 sends a datum to the control unit 10 concerning the level of charge of the traction battery 14.

A device or circuit 16 for detecting a state of weight of the vehicle implementing a detection method D1 sends a datum to the control unit 10 representative of the weight of the vehicle, in particular to determine whether or not the vehicle is in a state of excessive weight M1.

The method for managing G1 the charge of the traction battery 14 of the vehicle is managed by an energy management law embedded in the control unit 10 and it makes it possible, via a calculation of a target level of electrical energy, to drive the recharging or the discharging of the traction battery 14, notably as a function of the depression of the accelerator pedal 12, of the level of charge of the traction battery 14 and of the state of excessive weight M1 possibly detected by the detection device 16.

The method for managing G1 the charge of the traction battery 14 consists in detecting a state of excessive weight M1 of the vehicle, of the order of a few hundreds of kilograms and, when a state of excessive weight M1 is detected, in increasing (step 20—FIG. 2) the energy level stored in the traction battery 14 to a charge threshold value that is sufficient to meet exceptional temporary rolling conditions of the vehicle.

When the rolling profile is favorable, for example in urban rolling, preferentially so as not to affect the performance levels of the vehicle, the management of the charge of the traction battery 14 is driven by the control unit 10 so as to increase 20 the energy level in the traction battery to a sufficiently high charge level. The objective of the invention is to constitute a reserve of energy before the vehicle encounters a temporary rolling situation which requires more power and thus the vehicle can exploit the reserve of energy formed if necessary.

Figure 2:
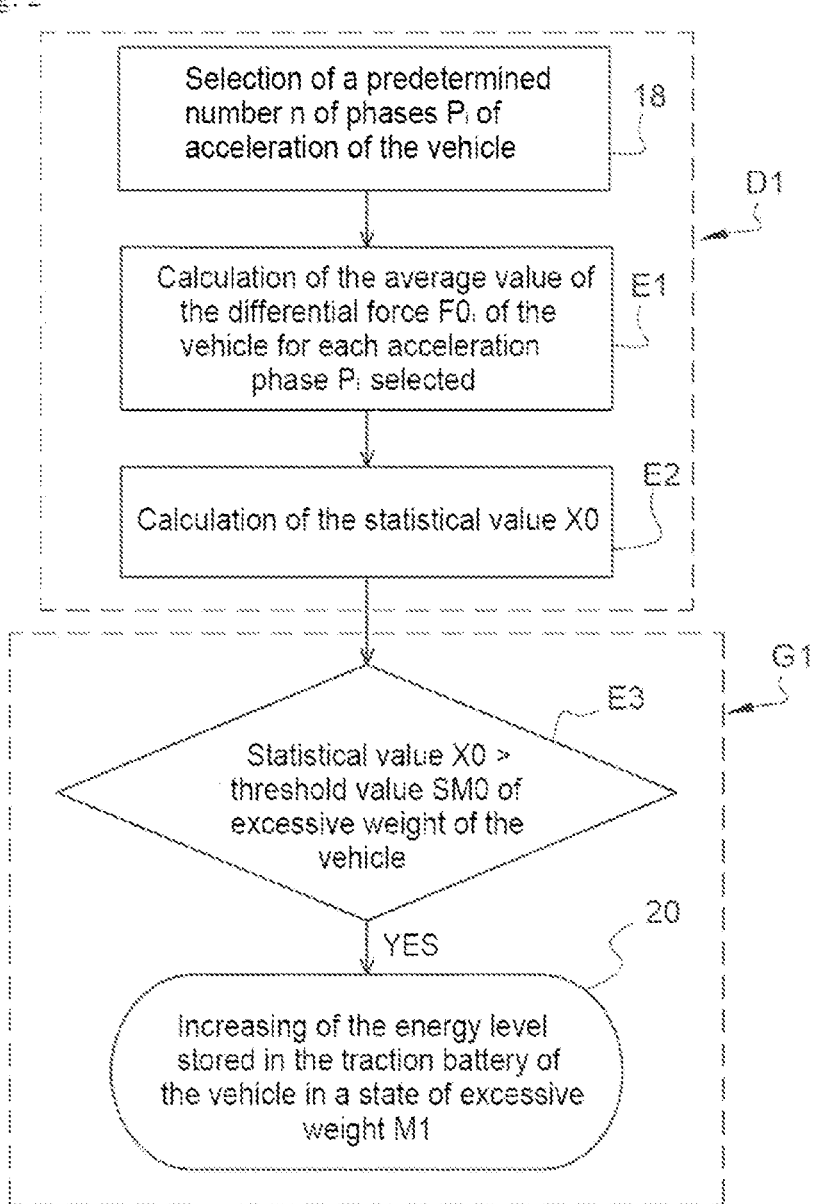

The method for detecting D1 a state of excessive weight M1 of the vehicle according to the invention associated with the method for managing G1 the charge of the traction battery 14 is illustrated in FIG. 2.

The method for detecting D1 a state of excessive weight M1 of the vehicle consists in selecting 18 a determined number n of phases Pi of longitudinal acceleration of the vehicle, for each of which the longitudinal acceleration is greater than a predetermined longitudinal acceleration threshold value SA0. For each phase Pi of longitudinal acceleration selected, the detection method D1 comprises the following successive steps:

a step E1 of calculation of an average value of a differential force F0i
   a step E2 of calculation of a statistical value X0 from the calculated average values F0i of the differential force, and
   a step E3 of comparison of the calculated statistical value X0 with a threshold value SM0 of excessive weight of the vehicle.

At the end of the comparison step E3, the vehicle is considered to be in a state of excessive weight M1 if the statistical value X0 is greater than the excessive weight threshold value SM0.

The detection of a state of excessive weight M1 of the vehicle by the detection method D1 provokes the increase 20 of the energy level stored in the traction battery 14 via the method for managing G1 the charge of the traction battery 14. The energy level stored in the traction battery 14 must reach a charge threshold value that is sufficient to meet exceptional temporary rolling situations of the vehicle and be maintained throughout the period of rolling of the vehicle that is considered to be in a state of excessive weight M1.

The differential force F0 is calculated via a calculation algorithm following the equations described in FIG. 3.

Selection 18 of a predetermined number n of phases Pi of longitudinal 0 acceleration of the vehicle:

$$A0 > SA0 \rightarrow A0_i$$

with:
   A0: longitudinal acceleration of the vehicle in m·s$^{-2}$,
   SA0: longitudinal acceleration threshold value in m·s$^{-2}$,
   A0$_i$: longitudinal acceleration of the vehicle during the $i_{th}$ longitudinal acceleration phase Pi selected in m·s$^{-2}$.

The value of the acceleration A0 of the vehicle must be high enough to obtain usable data. According to one exemplary embodiment of the invention, the longitudinal acceleration threshold value SA0 is greater than or equal to 0.5 m/s$^2$. A phase Pi of longitudinal acceleration begins when the value of the longitudinal acceleration A0 of the vehicle is greater than the longitudinal acceleration threshold value S0 and ends as soon as the value of the longitudinal acceleration A0 is less than the threshold value SA0. Calculation E1 of an average value of the differential force F0i:

$$F0_i = F1_i - F2_i - F3_i$$

with:
   i: $i_{th}$ phase Pi of longitudinal acceleration selected,
   F0i: differential force in N (Newtons),
   F1i: traction effort of the power train in N, F2i: resultant longitudinal acceleration force of the vehicle in N,
   F3i: resistive effort in N.

Calculation of the traction effort values of the power train F1i:

$$F1_i = \eta \times C_m \times \frac{\omega_m}{\omega_r \times R}$$

with:
   η: transmission efficiency,
   Cm: engine torque in N·m$^{-1}$,
   ωm: speed of rotation of the engine of the vehicle in m·s$^{-}$,
   ωr: speed of rotation of the wheels of the vehicle in m·s$^{-1}$,
   R: radius of the wheels of the vehicle in m.

In the case of a hybrid vehicle, the engine comprises a heat engine and an electric motor. The traction force designates the force which is exerted at the periphery of the drive wheels in contact with the ground to ensure the movement of the vehicle. The function of the traction force is to produce the movement and the speed of the vehicle.

Calculation of the value of the resultant acceleration force of the vehicle F2i:

$$MO \times A0_i$$

with:
   M0: reference weight of the vehicle in kg,
   A0$_i$: longitudinal acceleration of the vehicle in the $i_{th}$ longitudinal acceleration phase Pi selected in m·s$^{-2}$.

The reference weight M0 of the vehicle is defined as being the constant minimum weight of the vehicle, that is to say the weight of the vehicle in running order plus the standard weight of two persons onboard. The weight of the vehicle in running order is its weight including: the consumables, the functional fluids such as the oil and coolant, the spare wheel and the driver of the vehicle. The standard weight of the driver and of the passengers is set at 75 kg. For the calculation of the average of the differential force F0i, the value of the reference weight M0 of the vehicle is a predefined constant value associated with the motor vehicle model.

Calculation of the value of the resisting efforts F3i:

$$F3_i = F4_i + F5_i + F6_i$$

with:
   F4i: aerodynamic drag force in N
   F5i: rolling resistance force in N
   F6i: force linked to the gradient of the terrain in N; calculation of the aerodynamic drag force F4i:

$$F4_i = \frac{1}{2} \times \rho \times V0^2 \times S \times C_x$$

with:
   ρ: density of the air in kg·m$^{-3}$,
   S: reference surface area in m$^2$,
   C$_x$: aerodynamic coefficient,
   V0: speed of the vehicle in m·s$^{-1}$.

The aerodynamic drag force F4$i$ designates the friction force of the air in the direction opposite to the speed of the vehicle. The value of the aerodynamic force F4$i$ depends directly on the aerodynamic profile of the vehicle, the latter being able to be modified for example by the installation of roof bars or a roof trunk on the vehicle, or even the traction of a trailer or else of a caravan.

Calculation of the rolling resistance force F5$i$:

$$F5_i = M0 \times g \times C_{RR}$$

with:

M0: reference weight of the vehicle in kg, g: earth's gravity, $C_{RR}$: rolling resistance coefficient;

The rolling resistance force F5$i$ of the vehicle is a force linked essentially to the deformation of the tire while the vehicle is rolling. For the calculation of the average of the differential force F0$i$, the value of the rolling resistance coefficient $C_{RR}$ is a predefined constant value associated with the motor vehicle model.

Calculation of the force linked to the gradient of the terrain F6$i$:

$$F6_i = M0 \times g \times \sin(\alpha)$$

with:

M0: reference weight of the vehicle in kg, g: earth's gravity, $\alpha$: gradient of the terrain in degrees.

The force linked to the gradient of the terrain F6$i$ depends directly on the physiognomy of the terrain, that is to say in the case of an uphill or downhill slope. For the calculation of the average of the differential force F0$i$, the value of the gradient a of the terrain is a zero constant value.

The differential force F0$i$ is a quantity obtained according to the fundamental principle of dynamics ($\Sigma \overrightarrow{F}_{ext} = m \times \overrightarrow{a}$).

In nominal vehicle rolling conditions, the real value of the differential force F0$i$ is zero.

In a temporary vehicle rolling situation, that is to say in the case of a high uphill slope, strong winds or else a state of excessive weight M1 of the vehicle, the values of the resultant longitudinal acceleration force F2$i$ and/or of the resisting efforts F3$i$ increase.

Consequently, the value of the traction efforts F1$i$ of the power train increases proportionally to compensate for the resisting efforts F3$i$ exerted on the vehicle and which are linked to the aerodynamic drag force F4$i$, to the rolling resistant force F5$i$ and to the gradient of the terrain F6$i$, and/or to compensate for the resultant longitudinal acceleration force F2$i$ linked to the weight of the vehicle to maintain a zero real differential force F0$i$ value. Moreover, the calculation of the differential force F0$i$ takes account of the predefined quantities for the calculations of the values of the resisting efforts F3$i$ and of the resultant longitudinal acceleration force F2$i$. Consequently, in a temporary rolling situation, the average value of the differential force F0$i$ calculated becomes greater than zero.

In order to detect a state of excessive weight M1 of the vehicle, the calculation of the differential force F0$i$ must be performed on the basis of data acquired during a phase Pi of longitudinal acceleration because the value of the reference weight M0 of the vehicle has a great influence in the calculation of the resultant longitudinal acceleration force F2$i$.

Moreover, the number n of longitudinal acceleration phases Pi selected is a value associated with the motor vehicle. The value of n must be great enough to obtain a large sample thus making it possible to eliminate occasional non-nominal rolling situations, such as in the case of a high uphill slope or else strong wind. The larger the sample, the more the values of the resisting efforts F3$i$ are compensated and canceled while the vehicle is rolling. That makes it possible to obtain a value of the differential force that is linked only to the resultant force of the acceleration and therefore to the weight of the vehicle.

Calculation E2 of a total average value X0:

$$X0 = \frac{\sum_i^n F0_i}{n}$$

with:

X0: statistical value in N,

F0$i$: differential force in N, i: $i_{th}$ longitudinal acceleration phase Pi selected, n: total number of longitudinal acceleration phases Pi.

According to an exemplary embodiment of the invention, the statistical value X0 is an average of all the calculated average values F0$i$ of the differential force to filter the average values F0$i$ of the differential force and eliminate the values that are not representative, and for example an arithmetic mean. Comparison E3 of the statistical value X0 with the threshold value SM0 of excessive weight of the vehicle:

$$X0 > SM0$$

At the end of the comparison step E3, the vehicle is detected as being in a state of excessive weight M1 if the statistical value X0 is greater than the threshold excessive weight value SM0.

The threshold excessive weight value SM0 of the vehicle is a constant associated with the motor vehicle model, this value being generally determined by means of physical tests performed for each motor vehicle model.

The method for detecting D1 a state of excessive weight M1 of the vehicle is launched each time the motor vehicle is started up and it is performed at the most once each time the vehicle is rolling.

The selection 18 of the longitudinal acceleration phases Pi is disabled when the speed V0 of the vehicle is greater than a speed threshold value SV0. The speed threshold value SV0 corresponds for example to a speed on a fast lane such as a freeway. Preferentially, the detection method D1 is configured for speed values V0 of the vehicle corresponding to urban-type rolling.

Indeed, when the vehicle reaches high speed values V0, the longitudinal acceleration phases Pi are more rare and lower.

According to an exemplary embodiment of the invention the speed threshold value SV0 is greater than or equal to 90 km/h, a value dependent directly on the legislation of the country in which the vehicle is marketed.

According to a first mode of configuration of the invention, when the vehicle reaches a speed V0 greater than or equal to the speed threshold value SV0 the method for detecting D1 a state of excessive weight M1 of the vehicle is interrupted throughout the time the vehicle is rolling.

According to a second mode of configuration of the invention, when the vehicle reaches a speed V0 greater than or equal to the speed threshold value SV0, the detection method D1 is interrupted until the speed V0 of the vehicle is less than the speed threshold value SV0.

The association of FIGS. 4A, 4B and 4C illustrates an example of application of the method for detecting D1 a state of excessive weight M1 of a vehicle with the following input data:

reference weight M0 of the vehicle, variation of the speeds V0 of the vehicle as a function of time: FIG. 4A, variation of the longitudinal acceleration A0 of the vehicle as a function of time: FIG. 4B, longitudinal acceleration threshold value SA0: 0.5 m/s$^2$, number n of longitudinal acceleration phases $P_i$: 3, threshold value SM0 of excessive weight of the vehicle.

The control unit 10 of the vehicle receives information concerning the speed V0 of the vehicle and deduces therefrom the longitudinal acceleration A0 of the vehicle to select 18 a predefined number of three phases $P_1$, $P_2$ and $P_3$ of longitudinal acceleration of the vehicle according to which the longitudinal acceleration A0 is greater than the longitudinal acceleration threshold value SA0 of 0.5 m/s$^2$.

The detection method D1:

calculates E1 average values of the differential force $F0_i$ for each of the longitudinal acceleration phases $P_1$, $P_2$ and $P_3$: $F0_1$, $F0_2$ and $F0_3$;

calculation E2 of the statistical value X0 (FIG. 4C) which corresponds to the average of all the calculated average values of the differential force $F0_{1 \text{ to } 3}$:

$$X0 = \frac{\sum_{i=0}^{3} F0_i}{3}$$

comparison E3 of the statistical value X0 with a threshold value SM0 of excessive weight M1 of the vehicle:

if X0>150 N, the vehicle is considered to be in a state of excessive weight M1 and the management method G1 proceeds to increase 20 the level of energy stored in the traction battery 14 of the vehicle to a charge threshold that is sufficient to meet exceptional temporary rolling situations of the vehicle, or if X0<150N, the vehicle is not considered to be in a state of excessive weight M1 and the management method G1 does not intervene because the energy level stored in the traction battery 14 is sufficient to meet exceptional temporary rolling situations of the vehicle because the weight of the vehicle is not excessive.

The detection of a state of excessive weight M1 of a vehicle by a detection method D1 according to the invention via a calculation of differential force based on a constant value of the reference weight M0 of the vehicle makes it possible to obtain reliable and accurate information on the weight of the vehicle.

The association of such a detection method D1 with a method for managing G1 the charge of the traction battery 14 makes it possible to proceed to recharge the traction battery 14 before the vehicle encounters an exceptional temporary rolling situation which requires more power.

The early constitution of a reserve of energy in the case of a state of excessive weight M1 of the vehicle makes it possible to maintain a satisfactory driving service perceived by the driver of the vehicle.

Furthermore, such a strategy does not require the use of any sensor to constitute the reserve of electrical energy of the traction battery 14.

KEY

10: control unit

12: accelerator pedal

14: traction battery

16: device for detecting a state of excessive weight of the vehicle

18: selection of a predetermined number of longitudinal acceleration phases of the vehicle $F0_i$: differential force $F1_i$: traction effort $F2_i$: resultant force $F3_i$: resisting effort $F4_i$: aerodynamic drag force $F5_i$: rolling resistance force $F6_i$: force linked to the gradient of the terrain D1: method for detecting a state of excessive weight of the vehicle G1: method for managing the charge of a traction battery of the vehicle $P_i$: longitudinal acceleration phase n: number of longitudinal acceleration phases X0: statistical average M0: reference weight of the vehicle SM0: threshold value of excessive weight of the vehicle V0: speed of the vehicle SV0: speed threshold value A0: longitudinal acceleration of the vehicle SA0: longitudinal acceleration threshold value E1: calculation of an average value of a differential force E2: calculation of a statistical value E3: comparison of the statistical value with a threshold value of excessive weight of the vehicle 20: increasing of the energy level stored in the traction battery

The invention claimed is:

1. A method for detecting a state of excessive weight of a motor vehicle equipped with a power train comprising a traction battery, the method comprising:

selecting a determined number of phases of longitudinal acceleration of the vehicle, for each of which the longitudinal acceleration is greater than a longitudinal acceleration threshold value; and for each selected longitudinal acceleration phase:

calculating an average value of a differential force which is equal to a value of traction efforts of the power train from which are subtracted a value of a resultant longitudinal acceleration force of the vehicle and a value of a sum of resisting efforts to which the vehicle is subjected while rolling, calculating a statistical value from the calculated average values of the differential force, and comparing the calculated statistical value with a threshold value of excessive weight of the vehicle, wherein the vehicle is in a state of excessive weight when the statistical value is greater than the threshold value of excessive weight of the vehicle.

2. The detection method as claimed in claim 1, wherein the statistical value is an average of all the calculated average values of the differential force.

3. The detection method as claimed in claim 1, wherein the threshold value of longitudinal acceleration is greater than or equal to 0.5 m/s². 5

4. The detection method as claimed in claim 1, wherein the selecting the longitudinal acceleration phases is disabled when a speed of the vehicle is greater than a speed threshold value. 10

5. The detection method as claimed in claim 1, wherein the number of longitudinal acceleration phases selected is a value associated with the motor vehicle.

6. The detection method as claimed in claim 1, wherein 15 the resultant longitudinal acceleration force is defined by a product of a value of a constant value of a reference weight of the vehicle by the value of the longitudinal acceleration of the vehicle.

7. The detection method as claimed in claim 1, wherein 20 the resisting efforts are defined by a sum of aerodynamic drag forces of the vehicle, of rolling resistance forces of the vehicle, and of forces linked to a gradient of a terrain.

8. A method for managing a charge of a traction battery of 25 a motor vehicle, comprising:

detecting a possible state of excessive weight of the vehicle; and

increasing, when the state of excessive weight is detected, an energy level stored in the traction battery to a charge threshold to respond to temporary vehicle rolling situations, wherein the detecting includes selecting a determined number of phases of longitudinal acceleration of the vehicle, for each of which the longitudinal acceleration is greater than a longitudinal acceleration threshold value; and for each selected longitudinal acceleration phase:

calculating an average value of a differential force which is equal to a value of traction efforts of a power train from which are subtracted a value of a resultant longitudinal acceleration force of the vehicle and a value of a sum of resisting efforts to which the vehicle is subjected while rolling, calculating a statistical value from the calculated average values of the differential force, and comparing the calculated statistical value with a threshold value of excessive weight of the vehicle, wherein the vehicle is in a state of excessive weight when the statistical value is greater than the threshold value of excessive weight of the vehicle.

9. A power train comprising:

a heat engine and an electric motor associated with a traction battery, wherein the charge of the traction battery is controlled by the management method as claimed in claim 8.

* * * * *